US008843476B1

(12) United States Patent
Zhang

(10) Patent No.: US 8,843,476 B1
(45) Date of Patent: Sep. 23, 2014

(54) SYSTEM AND METHODS FOR AUTOMATED DOCUMENT TOPIC DISCOVERY, BROWSABLE SEARCH AND DOCUMENT CATEGORIZATION

(76) Inventor: Guangsheng Zhang, Palo Alto, CA (US)

( * ) Notice: Subject to any disclaimer, the term of this patent is extended or adjusted under 35 U.S.C. 154(b) by 578 days.

(21) Appl. No.: 12/782,545

(22) Filed: May 18, 2010

Related U.S. Application Data

(63) Continuation of application No. 12/715,385, filed on Mar. 2, 2010, now abandoned.

(60) Provisional application No. 61/160,625, filed on Mar. 16, 2009, provisional application No. 61/298,422, filed on Jan. 26, 2010.

(51) Int. Cl.
*G06F 7/00* (2006.01)
*G06F 17/30* (2006.01)

(52) U.S. Cl.
USPC ........................................................ 707/723

(58) Field of Classification Search
USPC ........................................................ 707/723
See application file for complete search history.

(56) References Cited

U.S. PATENT DOCUMENTS

| 5,930,788 | A | * | 7/1999 | Wical | 1/1 |
| 5,933,822 | A | * | 8/1999 | Braden-Harder et al. | 1/1 |
| 6,101,515 | A | * | 8/2000 | Wical et al. | 715/234 |
| 6,487,545 | B1 | * | 11/2002 | Wical | 706/45 |
| 6,842,730 | B1 | * | 1/2005 | Ejerhed et al. | 704/9 |
| 2005/0234953 | A1 | * | 10/2005 | Zhang et al. | 707/101 |
| 2007/0168181 | A1 | * | 7/2007 | Ejerhed et al. | 704/9 |
| 2009/0024489 | A1 | * | 1/2009 | Baldua et al. | 705/27 |
| 2009/0063265 | A1 | * | 3/2009 | Nomula | 705/14 |
| 2009/0089277 | A1 | * | 4/2009 | Cheslow | 707/5 |
| 2009/0259650 | A1 | * | 10/2009 | Schuil | 707/5 |
| 2010/0228693 | A1 | * | 9/2010 | Dawson et al. | 706/12 |
| 2011/0043652 | A1 | * | 2/2011 | King et al. | 348/222.1 |

\* cited by examiner

*Primary Examiner* — Hosain Alam
*Assistant Examiner* — Navneet K Ahluwalia

(57) ABSTRACT

A computer-assisted method for discovering topics in a document collection is disclosed. The method includes obtaining a group of text units in the document collection, tokenizing the words in the group of text units to produce a plurality of tokens that include a jth token, and adding a weighting coefficient to a parameter token_j_count for each text unit in the first group that includes the jth token. The weighting coefficient is dependent on the grammatical role of the jth token. The method includes calculating an internal term prominence value (ITP) using token_j_count, selecting one or more tokens from the tokens based on the ITP values of the respective tokens, and outputting the one or more selected tokens as topic terms associated with the document collection.

20 Claims, 12 Drawing Sheets

Terms and Associated External Prominence Values for Different Grammatical Types

| Terms | Type 1 | Type 2 | Type 3 | Type 4 | Type 5 | Type 6 | Type 7 | Type 8 | Para-graph | Docu-ment |
|---|---|---|---|---|---|---|---|---|---|---|
| Computer | 0.002 | 0.0003 | 0.05 | 0.0004 | 0.03 | 0.09 | 0.001 | 0.03 | 0.21 | 0.05 |
| CUP | 0.001 | 0.0004 | 0.002 | 0.0002 | 0.03 | 0.099 | 0.001 | 0.03 | 0.14 | 0.009 |
| Memory | 0.004 | 0.0006 | 0.054 | 0.0003 | 0.03 | 0.093 | 0.001 | 0.03 | 0.05 | 0.0045 |
| Hard disk | 0.006 | 0.0003 | 0.056 | 0.0004 | 0.03 | 0.095 | 0.001 | 0.03 | 0.07 | 0.222 |
| Software | 0.002 | 0.0003 | 0.058 | 0.0006 | 0.03 | 0.096 | 0.001 | 0.03 | 0.08 | 0.021 |
| ...... | | | | | | | | | | |

Figure 4

| From | Subject | Keywords | Date | Size |
|---|---|---|---|---|
| John | Re: Weekend Exercise | Hiking, Next Sunday, | 3/1/2009 | 8 KB |
| Mary | Weekend Exercise | Lakeside, park | 2/27/2009 | 2 KB |
| Mary | bascketball | Lakers | 2/20/2009 | 6 KB |
| Michael | Re: Class schedule | Afternoon labs | 2/3/2009 | 5 KB |
| Susan | Class schedule | physics, English | 2/3/2009 | 4 KB |
| Jason | Re: Healthy food info | Healthy food, club activity | 1/21/2009 | 4 KB |
| Jim | Re: Healthy food info | Healthy food, club activity | 1/21/2009 | 3 KB |
| Jessica | Healthy food info | Healthy food, new studies | 1/20/2009 | 3 KB |

Figure 10

SYSTEM AND METHODS FOR AUTOMATED DOCUMENT TOPIC DISCOVERY, BROWSABLE SEARCH AND DOCUMENT CATEGORIZATION

CROSS REFERENCES TO RELATED APPLICATIONS

The present application is a continuation of and claims priority to U.S. patent application Ser. No. 12/715,385, titled "System and methods for automated document topic discovery, browsable search and document categorization", filed on Mar. 2, 2010 now abandoned. U.S. patent application Ser. No. 12/715,385 claims priority to U.S. Provisional Patent Application 61/160,625, titled "System, methods, user interface, and article of manufacture for scalable knowledge-based document topic discovery, content recognition, search, ranking, and categorization", filed by the present inventor on Mar. 16, 2009, and U.S. Provisional Patent Application 61/298, 422, titled "System and methods for automated document topic discovery, browsable search and document categorization", filed by the present inventor on Jan. 26, 2010, the contents of which are incorporated herein by reference.

BACKGROUND

The present application relates to information management, and more particularly, to technologies for topic identification in natural language contents, and for searching, ranking, and classification of such contents.

In the information age, more and more individuals and organizations are faced with the problem of information overload. Accurate and efficient methods for information access, including collection, storage, organization, search and retrieval are the key to successful information management.

Much of the information is contained in natural language contents in the form of documents. Various theoretical and practical attempts have been made to organize and determine the amount and relevancy of information in natural language contents for efficient access to such information. The existing techniques, including various search engines and document classification systems, however, are often not sufficiently accurate in identifying the quantity and focus of the information in the content, thus often cannot effectively serve the information needs of their users. There is still a need for accurate, efficient, and automated technologies to search, rank, and organize large amounts of natural language contents based on the focus and quantity of information they contain.

One particular challenge in information management is to efficiently organize the so-called "unstructured data". Usually, a document collection in its natural state is unorganized, or in a so-called unstructured state. Such document collections, in the general sense, include Web pages scattered over the Internet, various documents in a company or other organizations, and even documents on many personal computers, as well as emails. Information in the unstructured document data is accessed usually by sending queries to an information retrieval system such as a search engine or index server that returns the documents believed to be relevant to the query.

The problem with using queries to access unknown data is that the user may not always know what kind of information may actually exist in the document collection, and what key words are the most effective for retrieving the most relevant information. Often, time is wasted before the needed information is found.

One approach to provide easy access to unstructured document data is to manually organize a document collection into a directory or category structure, from which, users can browse the collection according to the topics or areas of interest for their information needs. This approach, however, usually carries a huge labor cost associated with manually building and maintaining such directories or category systems.

SUMMARY

The presently disclosed systems and methods are intended to meet the above described challenges and overcome the drawbacks in the conventional information management techniques. An efficient, reliable, and scalable solution is provided for organizing and transforming unstructured data into forms that can be easily accessed and managed by the users. The disclosed systems and methods can be applied to the automatic identification or discovery of the potential topics in a document collection, with quantitative measures of the degrees of prominences of such topics in the collection. A user interface including multi-layered browsable topic lists can provide clues to the types of contents present in a collection of unstructured document data, and can significantly enhance the efficiency of information search within the collection. The topic data can also be used to enable data-driven automatic categorization of such unstructured document data. The present disclosure also provides topic lists for documents that reside in directories or folders in a computer file system and email systems, allowing the user to quickly have an idea about the content of files in a directory or folder, or in multiple directories or sub-folders in a computer file system and email systems.

In a general aspect, the present invention relates to a computer-assisted method for discovering topics in a document collection. The method includes obtaining a first group of text units in the document collection by a computer system, wherein the text unit comprises a plurality of words; tokenizing the first group of text units by the computer system to produce a plurality of tokens that include a jth token; assigning token types to the tokens in the first group of text units according to the grammatical roles of the tokens; assigning weighting coefficients to the tokens in the first group of text units according to the token types of the tokens; for each text unit in the first group that includes the jth token, adding a weighting coefficient to a parameter token_j_count; dividing a cumulative value of the parameter token_j_count obtained from the first group of text units by the total number of text units in the first group to produce an internal term prominence value (ITP) for the jth token; selecting one or more tokens from the plurality of tokens at least in part based on the ITP values of the respective tokens; and outputting, by the computer system, a list of topic terms associated with the document collection, the list of topic terms comprising the selected one or more tokens.

Implementations of the system may include one or more of the following. The text units can include a sentence, a paragraph, or a document. The computer-assisted method can further include obtaining a data set comprising a plurality of external term prominence (ETP) values each associated with one of the plurality of tokens including the jth token, wherein the ETP is calculated using a second group of text units from outside of the document collection; and calculating a collection-specific term prominence value (CSTP) for the jth token using the ITP and the ETP values of the jth token. The one or more tokens can be selected from the plurality of tokens using the CSTP values of the respective tokens as topic terms associated with the document collection. The data set can be obtained by the following steps: obtaining the second group of text units from outside of the document collection; tokenizing the second group of text units to produce a plurality of tokens comprising the jth token; for each text unit in the second group that includes the jth token, adding a weighting coefficient to a parameter token_j_count; and calculating an external term prominence value (ETP) for the jth token by dividing a cumulative value of the parameter token_j_count obtained from the second group of text units by the total number of text units in the second group of text units. The value of the weighting coefficient can be dependent on the grammatical role of the jth token. The values of the weighting coefficients can be constant for different tokens.

The one or more tokens selected from the plurality of tokens can have their respective CSTP values above a predetermined threshold. The CSTP value is equal to the ITP value subtracted by the ETP value. The CSTP value can be the square of ITP value divided by the sum of the ITP value and the ETP value. The text unit can include a sentence, wherein the token types comprises one or more of a first token type defining a token that matches the subject of the sentence, a second token type defining a token that is the head in a multi-word phrase in the subject of the sentence, a third token type that is a modifier in a multi-word phrase in the subject of the sentence, or a fourth token type defining a token that matches the predicate of the sentence. The token types can include one or more of a fifth token type defining a token that is the head in a sub-phrase in the predicate of the sentence, a sixth token type defining a token that is a modifier in a sub-phrase in the predicate of the sentence, or a seventh token type defining a token that is in any other text in the sentence. The first group of text units can be obtained from one o more files in a file folder in a computer file system, or one or more emails in an email folder or an email mailbox. The computer-assisted method can further include categorizing the document collection into one or more categories, each of which is associated with one or more topic terms in the list of topic terms.

In another general aspect, the present invention relates to a computer system for discovering topics in a document collection. The computer system includes a first module that can obtain a first group of text units in the document collection, wherein the first group of text units comprises a plurality of words and to tokenize the first group of the text units to produce a plurality of tokens that include a jth token; a second module that can assign token types to the tokens in the first group of text units according to the grammatical roles of the tokens, to assign weighting coefficients to the tokens in the first group of text units according to the token types of the tokens, to add a weighting coefficient to a parameter token_j_count for each text unit in the first group that includes the jth token, to divide a cumulative value of the parameter token_j_count obtained from the first group of text units by the total number of text units in the first group to produce an internal term prominence value (ITP) for the jth token; and a third module that can select one or more tokens from the plurality of tokens at least in part based on the ITP values of the respective tokens and to output a list of topic terms associated with the document collection, the list of topic terms comprising the selected one or more tokens.

In another general aspect, the present invention relates to a system for automatically providing information highlighting for the content in one or more documents. The system includes a computer processing system that can obtain a first group of text units in the one or more documents, wherein the first group of text units comprises a plurality of words, to tokenize the first group of the text units to produce a plurality of tokens that include a jth token, to calculate an internal term prominence value (ITP) for the jth token, to select one or more tokens from the plurality of tokens at least in part based on the ITP values of the respective tokens to output a list of topic terms associated with the one or more documents, the list of topic terms comprising the selected one or more tokens; and a computing device in communication with the computer processing system. The computing device can enable the list of topic terms to be displayed in association with the one or more documents in a user interface on a display device.

Although the invention is particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 4 shows a datatable comprising terms and their associated external prominence values based on their roles in the grammatical and informational structure of various linguistic units.

FIG. 10 is an exemplified user interface showing the use of topic lists to highlight the content of individual emails.

DETAILED DESCRIPTION

Figure 1:
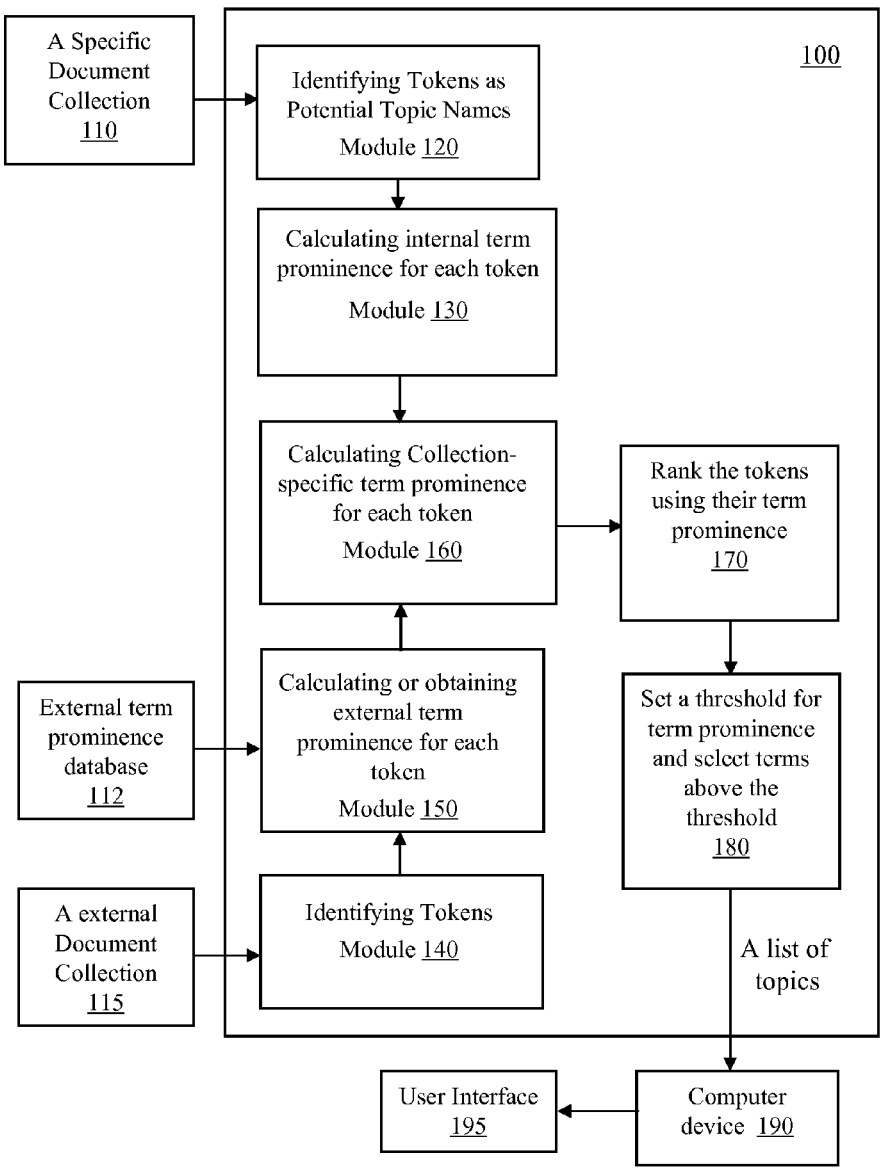
FIG. 1 is an exemplified system diagram for discovering topics in a document collection in accordance with the present invention.

The present disclosure provides systems and methods to first quantitatively determine the information prominence of a term, such as a word or a phrase, as an information-carrying unit in a document collection; and then to use such prominence data for efficient information search and organization of the document data.

The present disclosure is based on a theoretical framework developed by the present inventor about aspects of human knowledge and linguistic information.

Human knowledge, or aspects of human knowledge, can be represented in various ways. While internal knowledge representations are functions of human brains, external or artificial representations such as Frame Representation and Semantic Networks are simulation models for certain aspects of such internal knowledge.

The present invention is based on a novel model developed by the present inventor for knowledge and linguistic information representation. The model, called Object Properties Association Model (OPAM), states that part of human knowledge is based on concepts about objects and their associated properties, or based on relationships between different objects. Certain objects are perceived as the properties of other objects. Certain objects are associated with other objects in ways that uniquely define the concepts of such other objects.

The OPAM also states that such object-properties relationships are contained in our everyday language. Corresponding to the grammatical structure, there is an information structure in the language we use. Take a simple declarative sentence for example. A simple declarative sentence consists of two parts, the subject and the predicate. In linguistics, a common understanding is that the subject is what the sentence is about, and the predicate tells something about the subject. In the following simple sentences:

1A "John is a student."
1B "John is intelligent."

"John" is the subject of the sentences, while "is a student" and "is intelligent" are respectively the predicates of 1A and 1B.

In the OPAM model, the predicate is interpreted as providing a piece of measurable information about the subject of the sentence. The OPAM model also states that human languages convey information in the basic form of stating that an object has certain properties, or an object is associated with certain other objects as being its properties. The general information structure for a simple declarative sentence is "Object O has or is associated with Property P", or O+P, corresponding to the grammatical structure of "Subject+Predicate", where the Subject is the name of an object, and the Predicate is a declaration that the object has (or is associated with) one or more properties. In the present disclosure, the use of "simple sentence" and "simple declarative sentence" is interchangeable.

It should be noted that the term "object" used in the present disclosure is different from the grammatical term of "object" that refers to the object of a transitive verb, such as a noun or a pronoun, which may be in the accusative case in certain languages. In the present disclosure, this sense of "object" is not used. The sense of "object" used in the present disclosure is a thing or a concept with a name.

The simple sentence 1A is a statement about two objects of "John" and "student". In a conventional understanding, the speaker is telling something about John (that he is a student). In a mathematical or logical interpretation, the object "John" is declared to be a member of the object class of students. In the OPAM model developed by the present inventor, the object "John" is said to have or to be associated with a property of "being a student". The speaker is providing a piece of information about the object of "John". The simple sentence 1B associates another property with the object of "John" (that he is intelligent), thus providing another piece of information about the object of "John".

The same information structure in the simple sentences can also hold in complex sentences, as well as the grammatically distinguished compound sentences. A complex sentence is a sentence that contains other (embedded) sentences or clauses as its components. For example, in the complex sentence "I know that you are intelligent", the predicate "know that you are intelligent" contains another sentence of "you are intelligent", which has its own subject ("you" in this case) and predicate ("are intelligent"). Complex sentences, and simple sentences contained in them, can be recursively reduced to the atomic Subject+Predicate structure, corresponding to the basic information structure of Object+Property.

In conventional grammar, a compound sentence is a sentence that contains two or more independent clauses, or non-embedded clauses, such as "John is a student, and Mary is a teacher." in which the two clauses do not contain each other. For convenience, in the present disclosure, the term "complex sentence" refers to both the complex sentence and the compound sentence.

The subject or the predicate of a sentence can be in the form of a single word, a string of words or a phrase, or an embedded clause.

In linguistics, a phrase that consists of multiple words is often called a complex phrase, with an internal structure of "Modifiers+Head". For example, in the phrase "digital cameras", "digital" is the modifier, while "cameras" is the head. The order of the head vs. the modifiers in the phrase depends on the specific languages. In English, the head of a noun phrase may either be before or after the modifier. For example, in the phrase "the observed facts" and "the facts observed", the head noun of "facts" can be before or after the modifier. Under the OPAM model of the present invention, the informational structure of a complex phrase can also be represented by Object+Property, corresponding to the grammatical structure of the Head+Modifier. For example, in the phrase "digital camera", "digital" is interpreted as a property of the object of "camera".

A document can include one or more paragraphs. Each paragraph can include one or more simple and/or complex sentences. Details about other aspects of the Object-Properties Association Model and methods for quantitatively determining the information in a specific text unit for a specific object is disclosed in commonly assigned U.S. patent application Ser. No. 12/573,134, titled "System and Methods for Quantitative Assessment of Information in Natural Language Contents", filed on Oct. 4, 2009, and U.S. Provisional Patent Application 61/143,140, titled "System and Methods for Quantitative Assessment of Information in Natural Language Contents" filed on Jan. 7, 2009, both by the present inventor.

In the present disclosure, the focus is on identifying the general information focus of a document collection comprising one or more documents. In the OPAM model, symbolic names of objects and properties, such as a word, a multiword phrase, or any sequence of words or phrases, referred to hereafter as a term or terms, are information-carrying units in a document or a document collection. The model further states that such terms may represent the focus of the information in the documents to varying degrees depending on their roles in the grammatical and informational structure of the linguistic units that contain them, such as a sentence, a paragraph, or a document, and thus can be treated as potential topics or subjects of interest of such linguistic units. In the following description, a term may also be called either as a 'topic term" or an "information focus term".

The OPAM model further states that while property names (or property terms) may provide varying amounts of information about the object, the object names are of a higher degree of information prominence in the sentence than property names. Thus, the subject of a sentence in a document usually receives more information focus than other constituents of the sentence; and the head of a complex phrase usually receives more information focus than a modifier in the phrase. In OPAM model, this is the principle of degree of informational prominence based on the grammatical role of a term.

The model further states that for a given document collection, a term's informational prominence is further determined by the prominence of the term inside the document collection, herein called "the internal term prominence" (ITP), together with the prominence of the term outside the document collection, herein called "the external term prominence" (ETP).

In quantitatively assessing the strength of the information focus on a term, the present disclosure first uses a weighting coefficient method to distinguish the degree of information focus on terms that play different roles in the linguistic structure.

And then, the present disclosure provides methods for the calculations of the values of both the internal term prominence (ITP), and the external term prominence (ETP), and methods for calculating the collection-specific term prominence (CSTP) as a measure of the term's likelihood in being an information focus or a prominent topic term in the document collection.

The present disclosure also provides methods for the application of such information focus data as a solution to organizing the unstructured data and for efficient information search by providing multi-layered browsable topic lists that can serve as clues to what types of contents are present in the collection, and enable automatic document categorization as a further solution for organizing unstructured data for efficient access.

Referring to FIG. 1, a system 100 includes a plurality of functional modules 120 to 180. First, a specific document collection 110 is stored in the storage media in a computer system, and accessed by the system 100. Each term in each of the documents in the collection is extracted as a potential topic term by module 120. The Internal Term Prominence value for each term, also called a token, is calculated by module 130. On the other hand, a second document collection 115 comprising documents selected from outside of the specific document collection is optionally stored in the storage media in a computer system, and accessed by the system 100. In some embodiments, the second document collection can be from random sources. Each term in each of the documents in the second collection is extracted by module 140 as a token. The External Term Prominence value for each token from the second document collection is calculated by module 150. In some embodiments, the External Term Prominence values for a plurality of tokens from the second document collection can be pre-calculated by the module 150, and stored in a database 112. In such cases, the module 150 can bypass the second document collection 115 and module 140, and retrieve the External Term Prominence value for each token from the database 112.

Then, the Collection-Specific Term Prominence (CSTP) value for each token is calculated by module 160, using the values from the modules 130 and 150. The collection-specific term prominence (CSTP) is a measure of the strength of a term's information prominence in the document collection. Then, all the tokens are sorted in a sequential order by their CSTP values in module 170. A threshold value is set in a module 180 to select those tokens that have their CSTP values above the threshold. The selected tokens are output as a list of topic terms for documents contained in the specific document collection by the system 100. The output can be sent to a computing device 190 such as a computer server or a personal computer, which can enable the list of topic terms to be displayed on a user interface 195. More details about the display and usage of the list of topic terms are disclosed below in relation to FIGS. 8-11.

Figure 2:
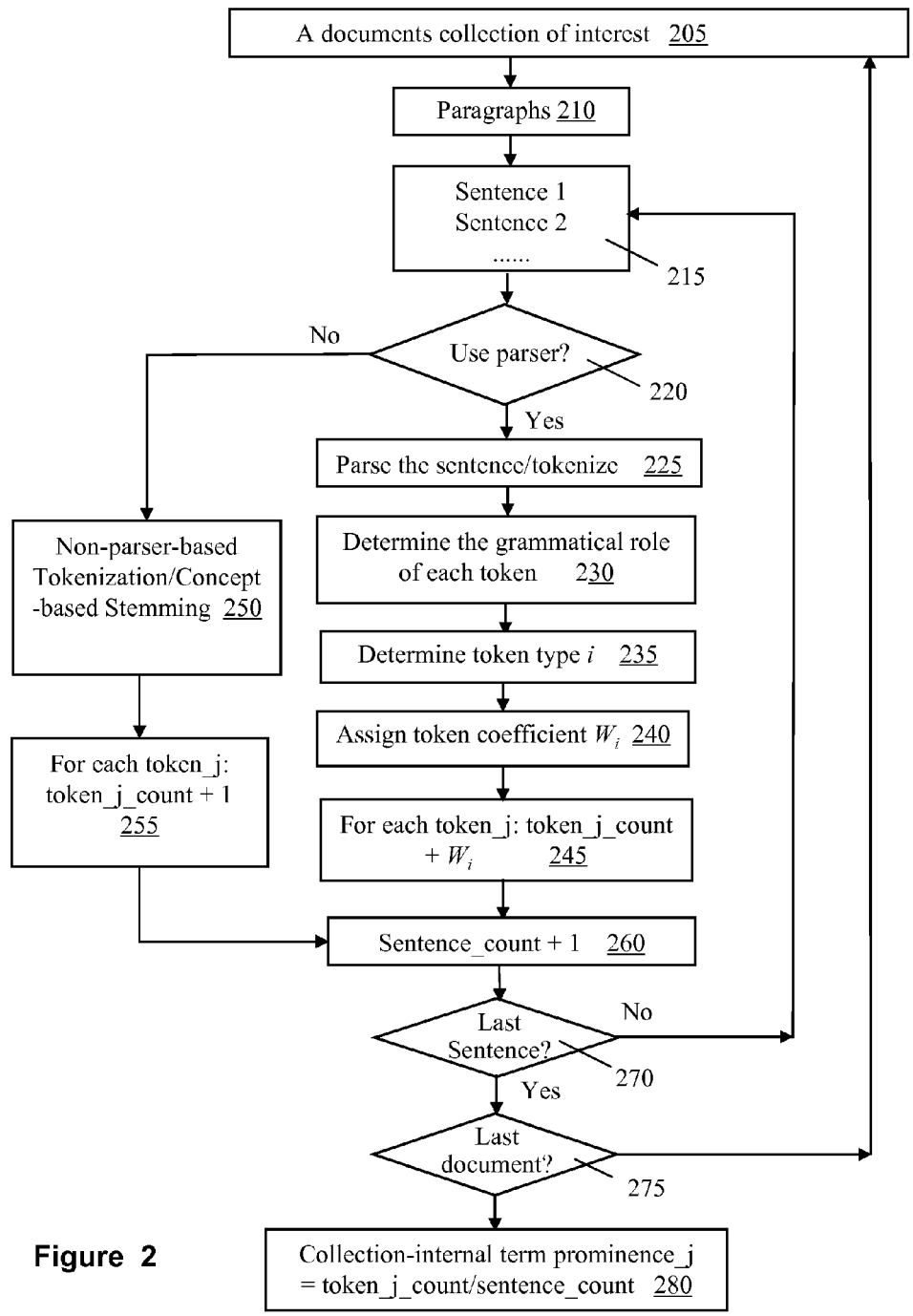
FIG. 2 is an exemplified flow diagram for automatically and quantitatively identifying topics contained in a collection of documents.

FIG. 2 illustrates the detailed steps for calculating the value of the internal term prominence for each term in a document collection. A specific document collection of interest, or the documents to be analyzed, is received (step 205). The document collection can contain one or more documents. For each document in the specific collection, the document is broken into smaller units of paragraphs (step 210) and sentences (step 215). Next, a decision is made whether a syntactic parser is to be used or not (step 220). The use of a syntactic parser is preferred, but not required. A syntactic parser is in most cases a rule-based procedure embodied in the form of a computer program. It receives a string of characters, such as a sentence or an equivalent, and outputs a structural description of the grammatical relations between various components of the sentence. Syntactic parsers of various types can be freely or commercially available, or can be constructed based on rules one wishes to employ. A syntactic parser can be used to divide a complex sentence into simple sentences, and divide a simple sentence into a subject and a predicate, and divide a complex phrase into modifiers and a head. As it is known, a syntactic parser may not always produce a structural description of a sentence that conforms to the understanding by human language users. Usually, a higher-precision parser produces better results, but often costs more computing resources. Depending on whether a syntactic parser is used or not, for each sentence, different words and/or phrases in the sentence are extracted as tokens or potential topic terms using different methods (steps 225, 250).

Depending on the specific language being processed, a process called stemming may be employed. This usually applies to many Western languages, such as English and other members of the Indo-European language family, and can also apply to certain Eastern languages. When it applies, as an optional step, the presently disclosed methods provide a novel approach of concept-based stemming in the tokenization of the sentences. The concept-based stemming merges only those words that are morphological variations of the names of the same concept or object name, for example, the plural form of a noun with the singular form of the same noun in English. In English, certain morphological variations of verbs, such as those for tense and aspects (e.g. "go", "went", and "gone") have their own shades of meanings and thus are not recommended for stemming. Variations for subject-verb agreement, such as "go" vs. "goes", are recommended for merging since they are referring to the same concept of an action. One aspect of the presently disclosed methods is that different rules of morphological consolidation can be used for specific languages. This concept-based stemming method is different from common practices in the conventional document retrieval or document classification.

In some aspects, the so-called "stop words" can be included in the presently disclosed methods. Some words that are treated as "stop words" in conventional techniques are considered here to be also meaning-carrying units in the language, which may be part of the names of potential objects or properties of certain objects. For example, "the" and "a" in English are conventionally excluded from text analysis as non-meaning-carrying words. However, phrases such as "a house" and "the house" can be very different in meaning under different contexts. For example, in a legal document about the ownership of a house, a sentence "He owns a house" can have a very different consequence from the sentence "He owns the house". Since the present system and methods involve the meanings of natural languages, such conventional "stop word" can be included.

If a parser is used, each sentence is parsed by the parser to identify grammatical components of the sentence such as the subject, the predicate and detailed structures within the subject and the predicate, or other parts of the sentence (step 230). For a multiword complex phrase, the parsing operation can identify the head and the modifier of the phrase.

Each token in the sentence is assigned a token type according to its grammatical role in the sentence as determined by the syntactic parser (step 235). An exemplar Token Type definition can include the following:

If the token matches the subject, the token is marked as a Type 1 token.

If the subject is or contains a multi-word phrase and the token is the head of the multiword phrase, the token is marked as a Type 2 token.

If the subject is or contains a multi-word phrase and the token is a modifier in the multiword phrase, the token is marked as a Type 3 token.

If the token matches the predicate of the sentence, the token is marked as a Type 4 token.

If the predicate is or contains a sub-phrase and the token is the head of the sub-phrase, the token is marked as a Type 5 token.

If the predicate is or contains a sub-phrase and the token is a modifier in the sub-phrase, the token is marked as a Type 6 token.

If the token is in any other text in the sentence, the token is marked as a Type 7 token.

As stated above in the OPAM model, different types of tokens may represent different degrees of the information focus as a result of their being in different positions in the grammatical and informational structure of the sentence.

Each type of token i is then assigned a weighting coefficient value (step 240). The weighting coefficient, can have an exemplar value between 0 and 1, the magnitude of which reflects the different degrees of likelihood that such a token may be an information focus in the sentence. Using the example of the Token Type definition described above, $W_1$ (for a Type 1 token) may be assigned a value of 1 because a term as the subject of a sentence is more likely to represent the information focus of the sentence than other types of tokens in the sentence. Thus, if the j-th token is a Type 1 token, then in the exemplar embodiment the parameter "token_j_count" is incremented by 1 (step 245) for each sentence the token occurs in, or in some embodiments, for each occurrence of the j-th token. Similarly, values of other weighting coefficients can be exemplarily set as $W_2$=0.9; $W_3$=0.8; $W_4$=0.7; $W_5$=0.6; $W_6$=0.5; $W_7$=0.4 for the corresponding types of tokens in accordance with the decreased likelihood that a token may represent the information focus of the sentence. In general, instead of simply counting one for each occurrence of the jth token, or for each sentence the token occurs in as in the exemplar embodiment, the contributions to "token_j_count" are the token's respective weighting coefficients that are associated with the specific type of the token. This is mathematically equivalent to each token count being scaled by the respective weighting coefficient values according to the type of the token.

If a parser is not used (step 250), as a follow up to a negative answer to the question in the step 220, the sentence bypasses the parsing and the token type and weighting coefficient assignment process from step 225 to step 245.

First, for the tokenization of the sentence, other methods such as single-word tokens or multi-word n-gram methods can be used (step 250). The concept-based stemming as described above can also be employed (step 250).

Then, in the exemplar embodiment, for each token in the sentence, the parameter "token_j_count" is simply incremented by 1 if the j-th token occurs in the sentence at least once (step 255). In some embodiments, token_j_count" is incremented by 1 for each occurrence of the j-th token if it occurs more than once in a sentence. Optionally, this case of not using a parser can be treated as a special case of using the parser where the parser does not label the token with any grammatical role, and a special token type, such as type 8, can be assigned to the token to indicate that no grammatical roles are determined, so that all occurrences of the token are treated the same, and the weighting coefficient of type 8 token can be assigned the value of 1.

After all tokens in the sentence are counted, the parameter "sentence_count" is next incremented by 1 (step 260). The parameter "sentence_count" tracks the total number of sentences that passes the step 220, each of which may include potential topic terms as the information focus associated with the document collection.

Steps 210 to 260 are repeated until all the sentences in a document (step 270) and all the documents in the collection (step 275) are processed. The collection-internal term prominence for the j-th token is the cumulative "token_j_count" divided by "sentence_count" that is the total number of the sentences in the document collection (step 280). Using the exemplified methods, the internal_term_prominence_j has a value between zero and one.

It should be noted that Token Type definition can include different variations, and the weighting coefficient $W_i$ can be assigned with different values.

In some embodiments, a single type of tokens, such as type 1, or a mix of a selected number of token types can be used without also using other types of tokens for the purpose of calculating the term prominence. One exemplar case for such a choice is when only the most likely topic terms need to be identified, such as type 1 or type 2 tokens.

Similarly, the number of sentences selected from the document collection can be a portion of the total sentences in the collection in step 205, and the "sentence_count" can be adjusted accordingly.

As has been described earlier in relation to OPAM, one of the principles in the OPAM model of the present disclosure is that the prominence of a term as a measure of information focus in a document collection can be determined by two related aspects of the term:

1) the prominence of the term inside the document collection, called "the internal term prominence", which is described above; and 2) the prominence of the term outside the document collection, called "the external term prominence", which is described below.

Figure 3:
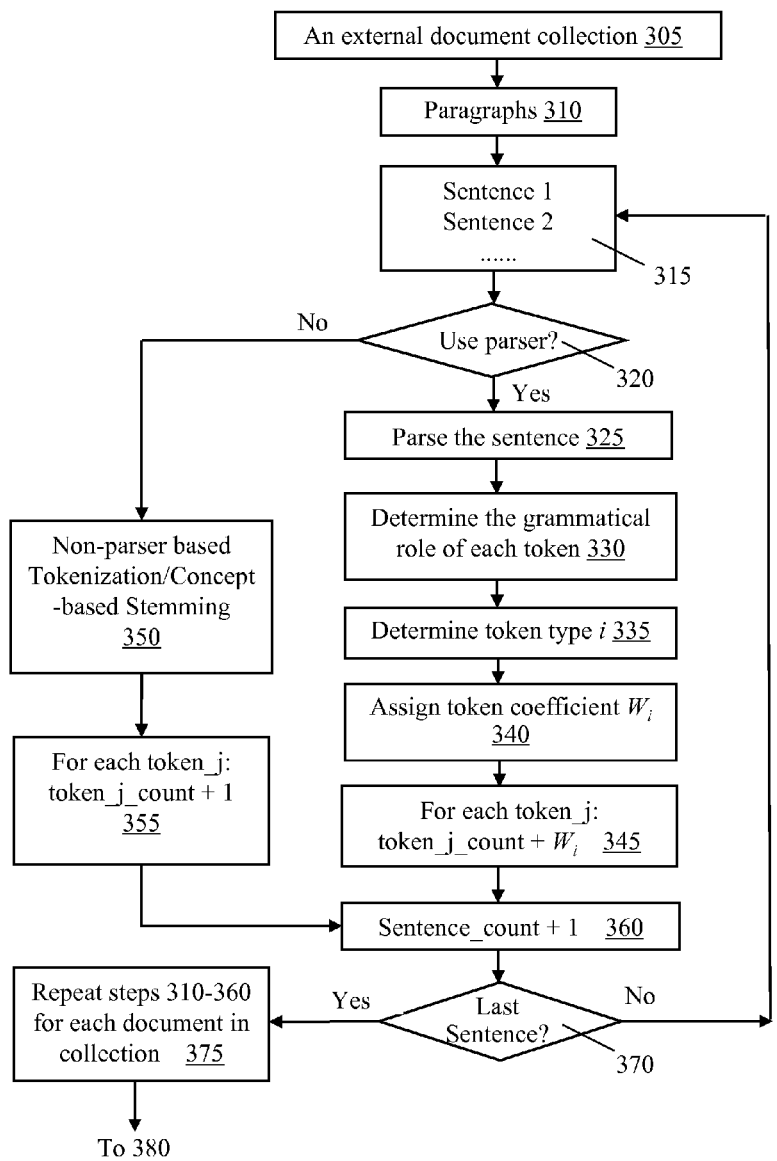
FIG. 3 is another exemplified flow diagram for automatically and quantitatively identifying topics contained in a collection of documents.
Figure 3:
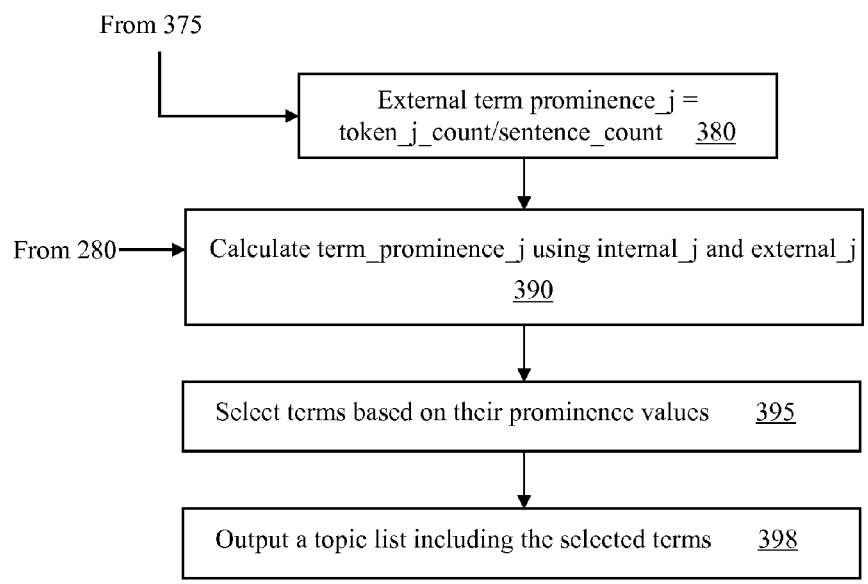

In some embodiments, referring to FIG. 3, a second group of documents are used to obtain the external term prominence for each corresponding token in the specific document collection. These documents can be randomly collected, or collected from sources that are believed to be different from the specific (the first) document collection (step 305). The data amount (the numbers of documents, paragraphs, and sentences) in the second group can be different from or the same as the data amount in the first group of documents. The documents are separated into paragraphs (step 310) and sentences (step 315).

The sentences each is then optionally parsed to identify its grammatical components such as the subject and predicate and other phrases. If a parser is used for the internal term prominence (step 225, FIG. 2), then a parser should also be used for the external term prominence to avoid inconsistency (step 325).

Similar to the steps in FIG. 2, if a parser is used, the grammatical role of each token is determined (step 330). Each token is assigned a Token Type (step 335) and a weighting coefficient Wi (step 340) according to its grammatical role. The parameter of token_j_count is incremented by the weighting coefficient Wi if the token is of type i (step 345).

If no parser is used, other methods of tokenization, including the single-word tokens or n-gram method can be used (step 350). Optionally, concept-based stemming process as described above can be used if it is also used for the internal term prominence. In the exemplar embodiment, "token_j_count" is incremented by one (step 355) for each sentence the token occurs in.

The "sentence_count" is incremented by one for each sentence in the document group (step 360).

Steps 315 to 360 are repeated until the last sentence in the document is processed (step 370). The steps 310 to 360 are repeated for all the documents in the second group (step 375). The external term prominence value for the jth token is calculated (step 380) by the cumulative token count for the jth token "token_j_count" in the second group of documents divided by the cumulative sentence count "sentence_count" in the second group of documents. Using the exemplified methods, the external_term_prominence_j has a value between 0 and 1.

In some embodiments, as with the first group of documents, a single type of tokens, such as type 1, or a mix of a selected number of token types can be used without also using other types of tokens for the purpose of calculating the term prominence values. Similarly, the number of sentences selected in the second group can be a portion of the total sentences from the second group of documents in step 315, and the "sentence_count" can be adjusted accordingly.

With both the internal and external term prominence data obtained from the above, the collection-specific term prominence (CSTP) for the jth token as a potential topic name is calculated (step 390) using the internal_term_prominence_j (ITP) obtained in step 280 (FIG. 2) and the external_term_prominence_j (ETP) obtained at the step 380.

In some embodiments, the collection-specific term prominence value (CSTP) for a jth token is computed (step 390) by the following equation:

$$CSTP_j = ITP_j - ETP_j \quad \text{(Eqn. 1)}$$

Using this method, the CSTP value for a token or a term can be in a range between −1 and 1. It should be noted that although a CSTP value can be −1 for a token, when the data for the external term prominence is in a large enough quantity and truly from different sources, such as random sources, most of the negative CSTP values tend to be slightly below zero. Thus, in some embodiments, negative CSTP values can be assigned to zero so that CSTP always has a value range between 0 and 1.

In some other embodiments, the collection-specific term prominence value CSTP can be calculated (step 390) using different formulae from the above, for example, using a formula:

$$CSTP_j = ITP_j * (ITP_j / (ITP_j + ETP_j)) \quad \text{(Eqn. 2)}$$

A beneficial feature of the formula in Eqn. (2) is that CSTP does not have negative values.

The text unit for counting tokens and computing ITP, ETP and CSTP can be paragraphs or documents in addition to sentences. Paragraphs as text units can also be viewed as a special case of using documents as text units. For example, when paragraphs are used as the text unit for calculating the term prominence, one exemplar method is that if a jth token occurs in a paragraph one or multiple times whether in the same or in different token types, the parameter "token_j_count" is incremented only once for each paragraph it is in, either by the highest weighting coefficient value Wi_max if a parser is used, or by one if no parser is used, no matter how many times the token occurs in that paragraph, and no matter what other token types it is in the same paragraph. The internal term prominence value for the jth token is calculated by dividing the cumulative "token_j_count" by the cumulative "paragraph_count". The same process is repeated in the second group of documents for calculating the external term prominence value ETP. The final CSTP value for the jth token is obtained using Equation (1) or Equation (2).

The same methods apply when the text units are documents instead of paragraphs.

Whether the text units are sentences, paragraphs or documents, the final collection-specific term prominence value CSTP can be compared with a preset threshold value. Terms having CSTP values greater than the threshold can be selected as the prominent topic terms of the document collection (step 395). It should be noted that terms can be selected using only their respective ITP values instead of CSTP values. In the former case, the calculations of ETP values can be skipped. The selected terms can be output as a topic list to the user interface or storage (step 398).

As is described earlier in relation to the system 100 in FIG. 1, the external term prominence data for a plurality of terms can be pre-calculated by the module 150 using the presently disclosed methods, and stored in a database, such as the database in 112. In some embodiments, this database can be a standalone product, and can be used for different specific document collections. The weighting coefficient for each type of tokens can be customized to suit the special user situations. Referring to FIG. 4, a data table includes a plurality of terms each associated with a plurality of fields for storing the term's external prominence values in various grammatical roles or token types. The data table can be stored, for example, in the database 112 (FIG. 1) or as a output of module 150 (FIG. 1). In the example, external prominence values for the term "computer" are listed for its respective roles as the subject (Type 1), the head of a multiword phrase in the subject (Type 2), the modifier in a multiword phrase in the subject (Type 3), the predicate (Type 4), the head of a multiword phrase in the predicate phrase (Type 5), the modifier of a multiword phrase in the predicate phrase (Type 6), and its other roles in a sentence (Type 7). The data table can also include a field (Type 8) that stores the external prominence value of a term without knowing its grammatical role, which can be used when no parser is used. For situations where lower precision can be tolerated, analysis without a parser can reduce cost. The data table can also include fields for the term prominence values when paragraphs or documents are used as the text units instead of sentences as described above. In the exemplar case shown in FIG. 4, the data for each token type can be respectively obtained for each type without using weighting coefficient for that type. This way, different weighting coefficient assignment methods can be used to fit different user needs when the data is used for the calculation of the CSTP for specific document collections of different nature.

It should be understood that the above-described methods are not limited to the specific examples used above. Configurations and processes can vary without deviating from the spirit of the invention. For example, a value range for the term prominence (or internal and external term prominence) can be selected other than the exemplified values described above. In calculating the ITP and ETP values, the counting method can be based on numbers other than the single occurrence of a token in a sentence, a paragraph, or a document. The total frequency of the token in a sentence, a paragraph, or a document can be used instead of the single occurrence counting, or can be used in combination with the single occurrence counting method. Other information such as the position of the token in the document or the position of the sentence in the paragraph or in the document can also be used in combination with the above mentioned methods. Different token types and associated weighting coefficient values as well as the methods for determining the types and coefficient values can be used. The data structure of token prominence values can differ from the examples given above without deviating from the spirit of the present invention. Other grammatical roles of tokens can also be used to characterize token types.

Moreover, the term prominence value can be expressed in the form of a continuous scale of numerical values or in the form of discrete ranges. The values of term prominence and/or the values of weighting coefficients can be in a range between 0 and 1, and/or in other ranges.

Automatic Topic Generation and Search with a Browsable Topic List

Figure 5:
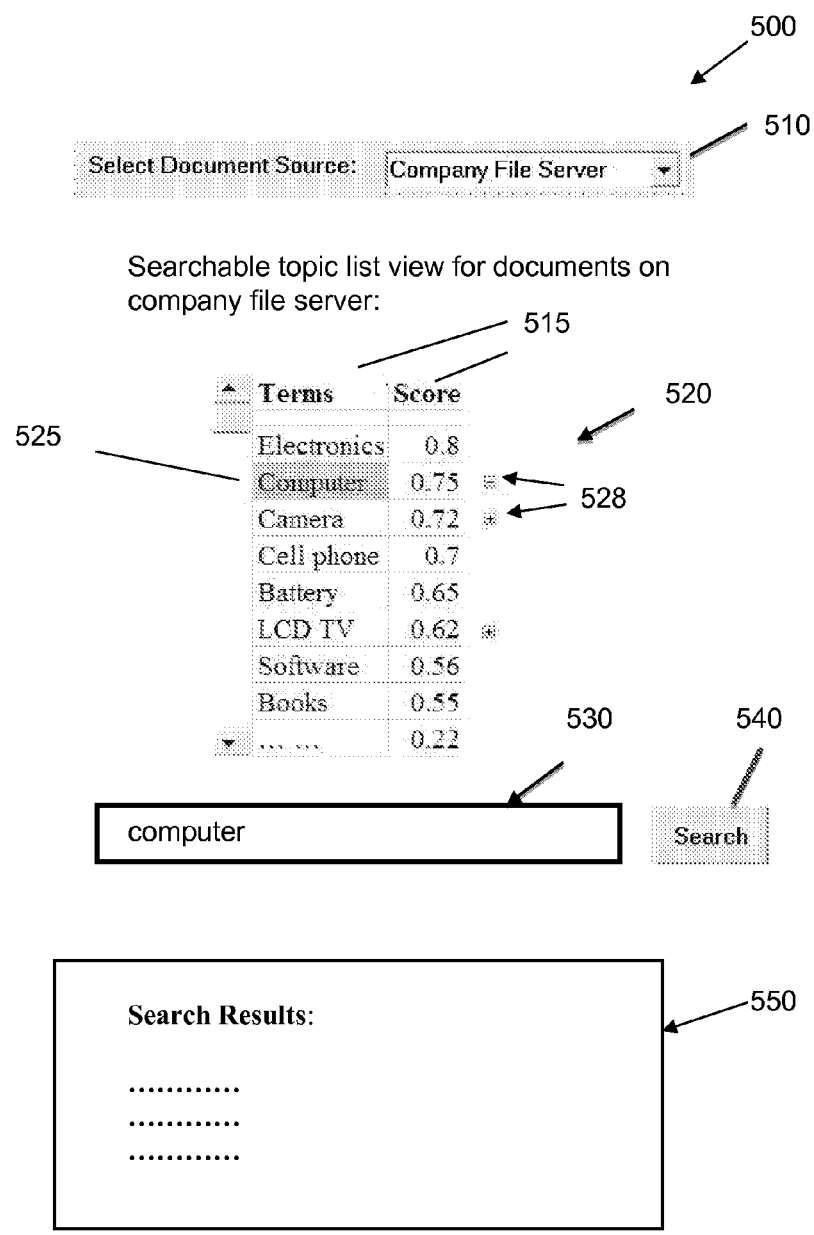
FIG. 5 shows an exemplified user interface for facilitating information search and retrieval using a list of topics.

The topic list produced by the system and methods described above can have a wide range of applications. FIG. 5 shows a user interface 500 that facilitates the search and retrieval of information in a document collection. The user interface 500 includes a text field 510 to allow a user to select a document collection, or its location, such as a company file server. For the specific document collection selected by the user, the computer system 100 (FIG. 1) produces a topic list 520 using the steps described above in conjunctions with FIGS. 1 to 4. The topic list 520 is browable by the user at the user interface 500. The user can re-order the terms in the topic list by various criteria, such as the term prominence values or the alphabetic order of the terms by clicking on the column headings 515. When the total number of topic terms that have above-the-threshold prominence values is large, the topic list can be re-ordered to bring those that may be the most relevant to the top of the list, so that if the user does not see a topic of interest, he or she can re-sort the list to bring up different topic terms to the top of the list. Such re-sorting criteria include the prominence value, the alphabetical order of the first term of the topic phrase, or that of the second or third term of the topic phrase if applicable, or other criteria such as the number of documents the term is in, etc.

Using the clues provided by the topics list, the user can select one or more terms 525 such as "computer" in the topic list as a search query phrase. In this example, the selected term "computer" is displayed in a query box 530. The user can click a search button 540 to initiate a search for documents about "computer" in the document collection. The computer system can search the relevant documents in the document collection and displays the results in an area 550.

The user interface shown in FIG. 5, and the related processes for automatic generation of topic list and searching with the guidance of the topic list have several advantages over conventional techniques. In a conventional search, a user needs to know what keyword or a query phrase to use when performing a search operation, whether the user is searching in a company document collection/server, or on the Internet, or on a personal computer, or in an email folder. This requires certain knowledge or guesswork about what may exist in the document collection. However, the user may not always know about the contents of the documents or what kinds of topics exist in the document collection. If the user enters a query phrase that is not a sufficient description of or not a good match with the contents the user is looking for, the search may fail. In the best case, such a search process may take several iterations, and can be time-consuming.

In contrast, the user interface shown in FIG. 5 and the related processes can automatically provide a topic list to give a user a sense about the main topics contained in the document collection. This is particularly useful with a document collection that has some concentration on certain topics. The user can use the topic list as a guide or hints when searching for contents that he/she is interested in. The user may no longer need to guess what keyword may be the best to use to search for the specific information in the document collection. The topic list can provide candidate keywords for the user. Presenting such a list of topic terms to the user at the time the user is trying to write a query can greatly facilitate the search process. The presently disclosed topic-assisted search methods can therefore significantly enhance the efficiency and accuracy of the information search. The presently disclosed topic-assisted search methods transform a cognitively more difficult process of writing a query to a cognitively easier process of browsing and selecting a topic as a pre-written query.

Figure 6:
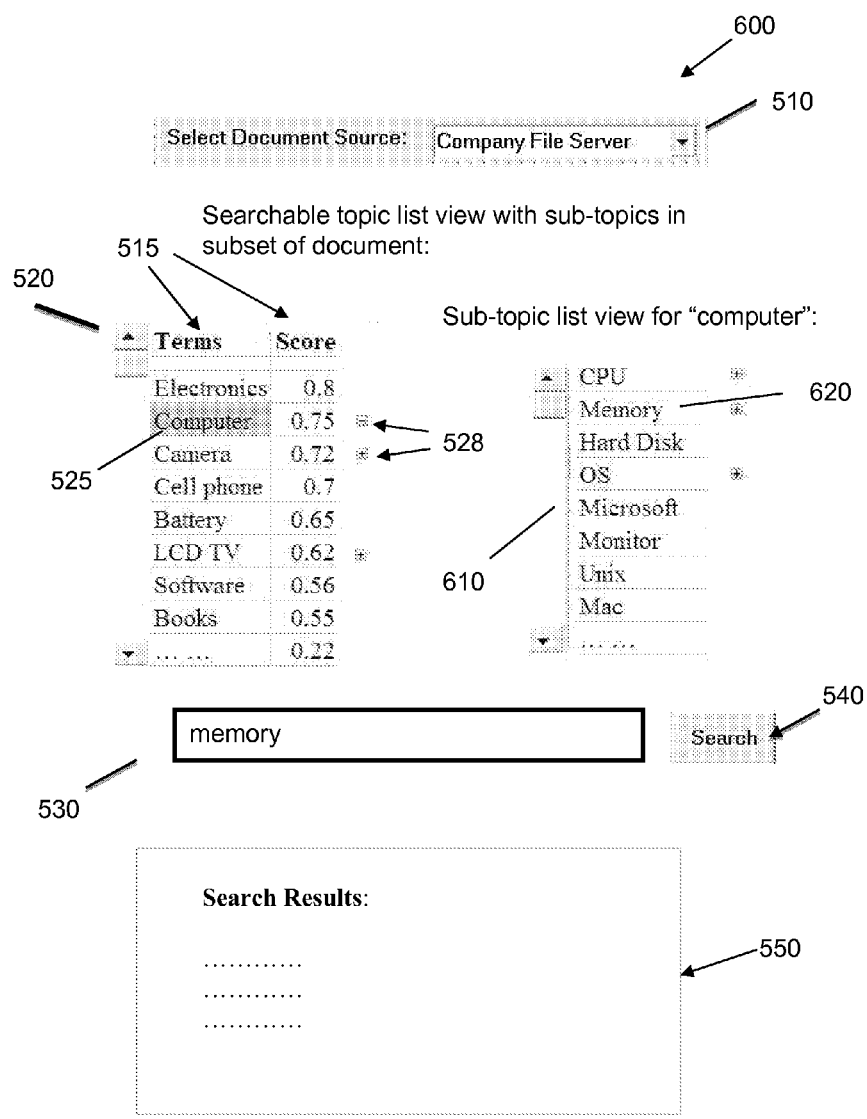
FIG. 6 shows an exemplified user interface for searching documents using topics and subtopics within a topic.

Automatic Topics Generation and Search with a Browsable Recursive Sub-Topic List The presently disclosed topic discovery methods and systems can be recursively applied to a subset of documents within a document collection. Referring to FIG. 6, after a user selects the document collection, the topic list 520 in the user-selected document collection is automatically displayed in a user interface 600. The user can select a term 525 such as "computer" in the topic list 520. After the term 525 "computer" is selected, the user can click on a button (528) next to the selected topic term, and a sub-topic list 610 is displayed, which is the topic list generated from the subset of the document collection that includes those documents in the collection that contain the topic term of "computer", or includes those documents in the collection that are returned by a search method as relevant to the query of the topic term of "computer". In this particular example, the sub-topic list of the subset of documents includes terms such as "CPU", "memory", "hard disk", etc. The sub-topic list 610 can be produced by the system 100 using the methods illustrated in FIGS. 2 to 4 as described above. The user can further select a term 620 such as "memory" in the sub-topic list 610. The term 620 automatically appears in the query box 530. The user can initiate a search by clicking the search button 540. The generation of sub-topics can be further repeated by several layers to provide the user with a more focused and more in-depth preview of the contents in the document collection.

Topics Assisted Search

Figure 7:
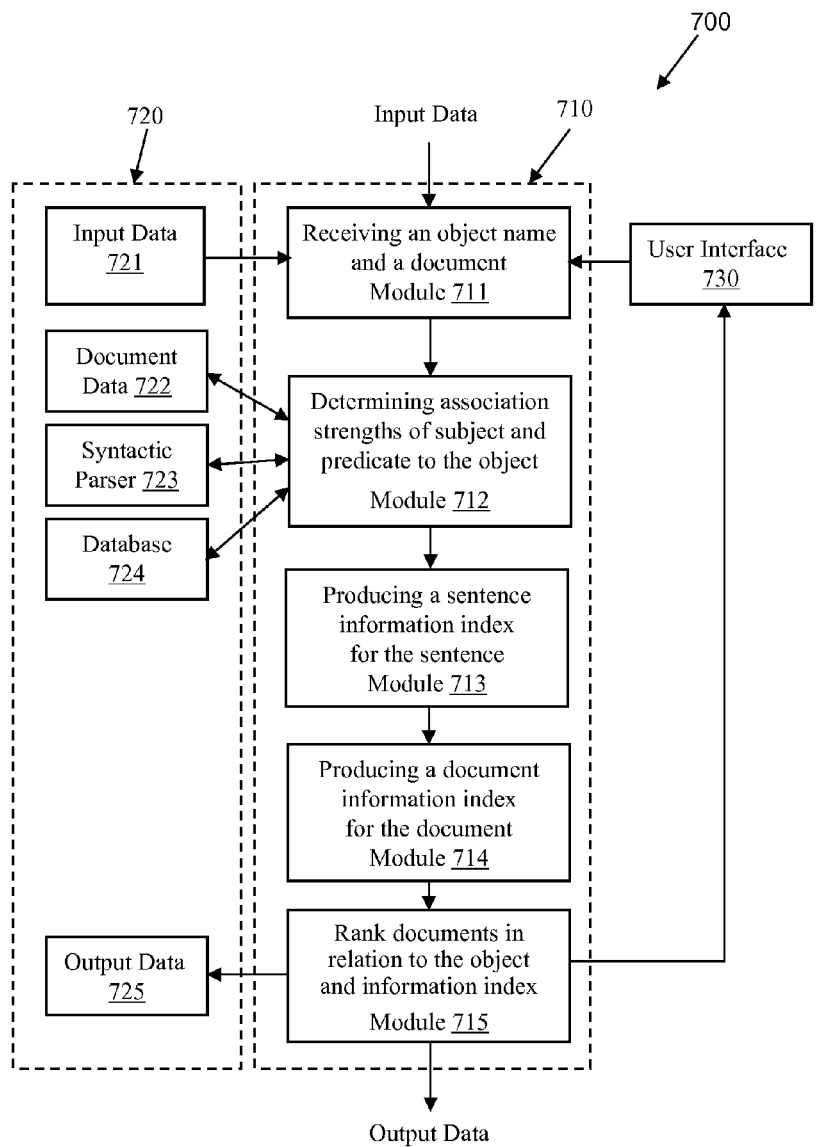
FIG. 7 is an exemplified system block diagram for quantitatively assessing information in natural language content.

The searches initiated by clicking button 540 in the user interfaces 500, and 600 in FIGS. 5 and 6 can be implemented by a system 700, shown in FIG. 7, which is based on quantitative assessment of information in the document contents. The system 700 includes a computer processing system 710, a computer storage system 720, and a user interface 730. The computer processing system 710 includes algorithmic applications that further include functional modules 711-715 for conducting quantitative assessment of information in the documents. The module 711 in the computer processing system 710 receives input data from an external source, input data 721 in the computer storage system 720, or the user interface 730. The input source can include a query from a web browser, a search text string entered by a user at a user interface (e.g. 730). The system 700 is also based on the Object Properties Association Model (OPAM) developed by the present inventor. The input query string includes an object name. The object name can be in the form of a word, a list of words or a phrase, a character string, a sub-component of such string. The object can be a physical object or an abstract object. The document retrieved from 722 can include any document that includes text in a language, such as a web page, a menu, a book, an email, a text message, an article, a dictionary, an instruction manual, etc. The module 711 can first receive a path to one or more documents, and subsequently retrieves the one or more documents according to the path. The document(s) can be stored in document data 722 in the computer storage system 720.

The computer storage system 720 can store, as described in more detail below, input data 721, document data 722 comprising one or more documents, optionally a syntactic parser 723, a database 724, and output data 725.

The database 724 in the computer storage system 720 stores names of a plurality of objects, the names of the properties for each object, and association-strength values of each property for an object. The object names, the property names, and the association-strength values can be stored in a table form, or in other data structures. Based on the OPAM model, the association strength of a property to a given object is a measure for the amount of information that the property potentially carries for the object. The amount of information that is actually realized can depend on the context in which the property term occurs. The database 724 can be called a Knowledge Base because it stores knowledge about associations among objects and properties.

When implementing the system 700 for search or for other operations, the database 724 can be downloaded from a data provider, or constructed from available data, or by manual input. In some embodiments, the database 724 can be developed by a data provider for individual object names or topic terms as pre-trained knowledge modules, stored at a central server, and each such module is downloadable to users as a standalone product. The users can subscribe to a service which allows updates of such data from the central server to the user's computing device. The user can selectively download only those topic-related knowledge modules that are relevant to the user's specific needs. This method allows the user to build up an individualized knowledgebase, and makes the knowledge-based search a highly scalable operation.

The system 700 is capable of quantitatively assessing information contained in a specific text unit for a pre-specified object name or a topic term as a query, and rank the documents based on such information as the documents' relevance scores to the query. Details about the system 700 is disclosed in commonly assigned U.S. patent application Ser. No. 12/573,134, titled "System and Methods for Quantitative Assessment of Information in Natural Language Contents", filed on Oct. 4, 2009, and U.S. Provisional Patent Application 61/143,140, titled "System and Methods for Quantitative Assessment of Information in Natural Language Contents" filed on Jan. 7, 2009, both by the present inventor.

Automatic Displaying of Topics in a File Folder or Directory

Figure 8:
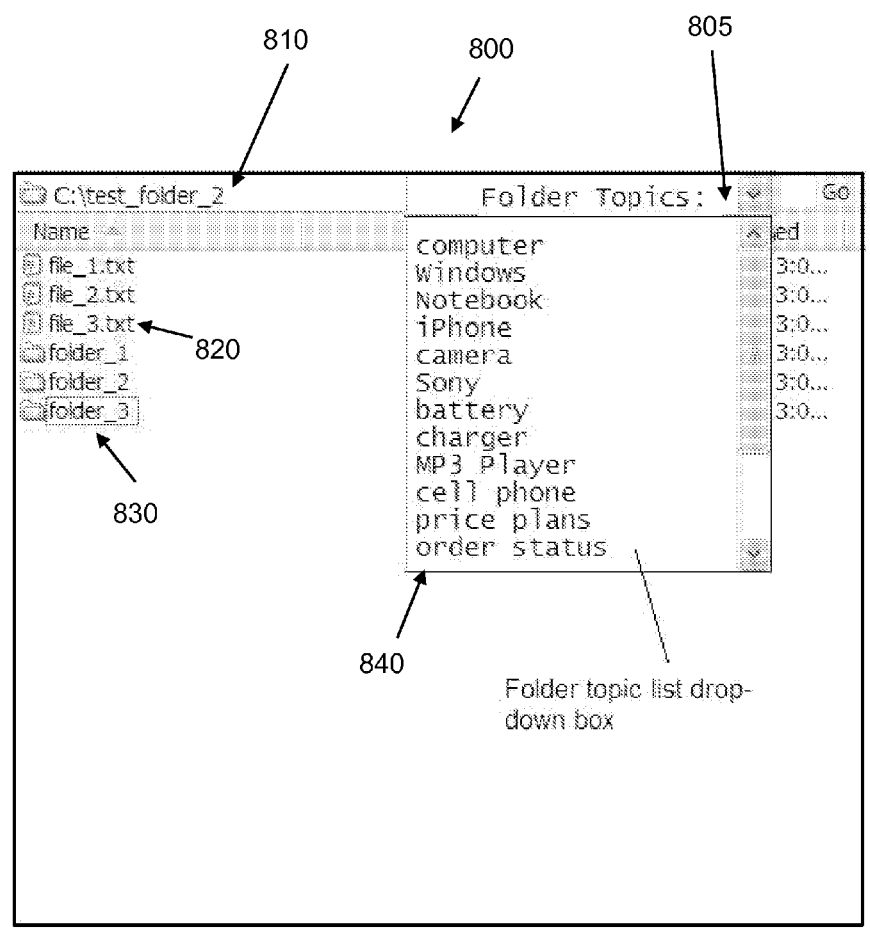
FIG. 8 is an exemplified user interface for displaying a list of topic terms for a group of documents in a document folder.

A file folder or directory in a computer file system containing one or more files or sub-folders can be treated as a specific document collection. The presently disclosed topic discovery methods and systems can be used to provide a user with a topic list for such a file folder or directory in a computer file system. Referring to FIG. 8, an exemplar user interface 800 displays a file directory 810, which can include files 820 and sub-folders 830. When the user clicks on a button such as the dropdown arrow (805) in the exemplar case, the topic list 840 for the folder 810 can be automatically displayed. The topics for the entire folder 810 can be produced by the system 100 (FIG. 1) using the methods illustrated in FIGS. 2 to 4 and described above. Other topic lists can also be produced and displayed for sub-folders such as 830. In some embodiments, a search can be performed using the terms on the topic list as pre-written queries.

Automatic Displaying of Topic Terms in a Single Document

Figure 9:
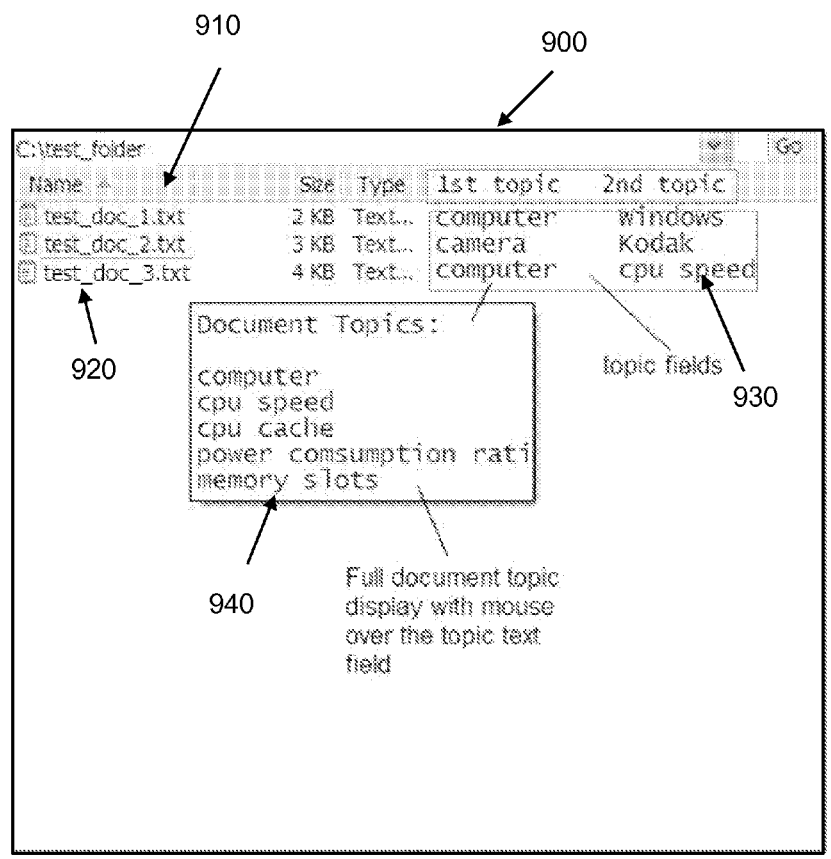
FIG. 9 is an exemplified user interface showing the use of topic lists to highlight the content of individual documents.

As has been described above, the specific document collection can sometimes contain only a single document. In this case, the collection-specific term prominence CSTP is the term prominence associated with the single document. The topic list for the document collection becomes the topic list of the single document. Referring to FIG. 9, an exemplar user interface 900 displays a file directory 910, which include files. For each file in the directory, a topic list can be produced and displayed, and in this exemplar case, each file's topic list is partially displayed as additional data fields in 930. In this exemplar case, the lists are only partially displayed because of the limited space in the user interface. In one implementation, the full topic list or a major part of the topic list of each file can be displayed when the user puts the pointing device such as a mouse over the partially displayed topic fields. For example, when the mouse is over the topic fields of the file 920, more topic terms are displayed in a window 940. The topic list for each file can be produced by the system 100 (FIG. 1) using the methods illustrated in FIGS. 2 to 4 and described above.

The topic list for a specific document allows a user to quickly have an idea about the main subject or topic of a specific document without opening the document, and without performing a search. This can greatly increase the efficiency and productivity in information search. The conventional methods of displaying file attributes such as in the Microsoft Windows folder detailed view may include metadata fields such as the author name, date, title, file size, etc. However, such metadata do not provide sufficient amount of information about the content of the document to the user. Some other data fields such as the "keywords" field will require time-consuming manual determination of the keywords candidate, and manual input into such fields. With the systems and methods in the present disclosure, topic terms that represent the file's content information are automatically identified and extracted, and can be displayed to the user along with other metadata about the file without any human effort on the user's side.

Automatic Displaying of Topic Terms for Emails and Email Folders or Directories

The presently disclosed system and methods are also applicable to other document collection systems such as email systems. Emails can be stored in folders just like the files in a folder of a computer file system as exemplified in FIG. 8. The topic list exemplified in FIG. 8 can also be applied to an email folder in the same way so that searching emails within a folder or within the entire mailbox with a browsable topic list can have the same benefit of transforming a query-writing or guessing process into a browsing process.

Furthermore, individual emails are just like individual files on a computer file system as exemplified in FIG. 9 above. The topic terms for individual email messages can be automatically produced by the system 100 (FIG. 1) using the methods illustrated in FIGS. 2 to 4, and described above. The topic terms of an email message can be displayed in a similar way as individual files to give the user a clue about the content of the email without opening the email. FIG. 10 is an exemplar user interface for this application.

An exemplar user interface 1000, shown in FIG. 10, displays a list of email messages 1010 and related information such as senders 1020, subject 1030 of the email messages, and dates when the email messages are received. The user interface 1000 can also include an additional data field 1015 titled "Keywords". The topic terms 1050 in each of the email messages can be automatically produced by the system 100 (FIG. 1) using the methods illustrated in FIGS. 2 to 4 and described above, and can be conveniently displayed in the "Keywords" field next to the Subject field of the email messages.

System and Methods for Automated Document Topic Discovery and Document Categorization Given a document collection, usually with unknown contents, a browsable topic list representing the main topics of the contents in the collection can be produced using the above described systems and methods. With such a topic list, the main topics of a document collection become known to the user. The documents with topics that match the user's query can be subsequently retrieved by selecting a topic in the topic list and performing a search using the topic terms as pre-written queries, thus turning a cognitively more difficult search process involving keyword guessing to a much easier process of browsing and selecting in a topic list.

However, there can be a large number of documents that share the same or similar topic in a large document collection. There is still a need to efficiently locate the most relevant information among a large number of documents even with the assistance of a topic list. The present disclosure provides methods for organizing such documents into well-structured categories of manageable sizes, so that specific information can be easily located and retrieved within the corresponding specific categories. As a result, a user may save a significant amount of time and efforts in locating the needed documents in a large collection of documents.

Conventionally, designing and constructing a category tree for a large document collection requires considerable amount of knowledge and labor from human experts. Efforts are needed to first obtain information about what kinds of documents and topics are there in the collection, and then to design a category system for grouping such documents into categories.

An important advantage of the presently disclosed system and methods is that organizing unstructured documents into a well-structured category tree will require minimal or even no human efforts. Documents that share the same topic may naturally form a hidden group or a category, sometimes also called a cluster. Thus, each topic term produced by the presently disclosed system and methods can potentially be the name of a category node, either by itself, or by combination with other topic terms. Usually, the more prominent a topic is in the collection, there are more likely documents that can be grouped under this topic.

Document collections within a specific organization such as a company, a bank, or a school, etc., usually concentrate on certain topics that are relevant to the specific organization. For example, a company in the business of car manufacturing will have a company-internal document collection with main topics about cars and various properties of cars. It is usually the case that the topic discovery methods in the present disclosure can accurately identify the main topics of the documents within such a collection.

Furthermore, even if the topics of the documents are scattered within the collection, a topic list of certain contents can still serve as a good starting point for designing a category structure. The presently disclosed system and methods are also based on the principle that it is cognitively easier to design a category tree from a list of candidate nodes than starting from nothing, in which case much human efforts may be needed to first obtain information about what kinds of documents and topics are there in the collection.

The categorization methods provided by the present disclosure can be implemented in an automatic mode or an interactive mode, which can be selected by users based on the availability of resources for human interaction, and on precision requirements of the results.

Figure 11:
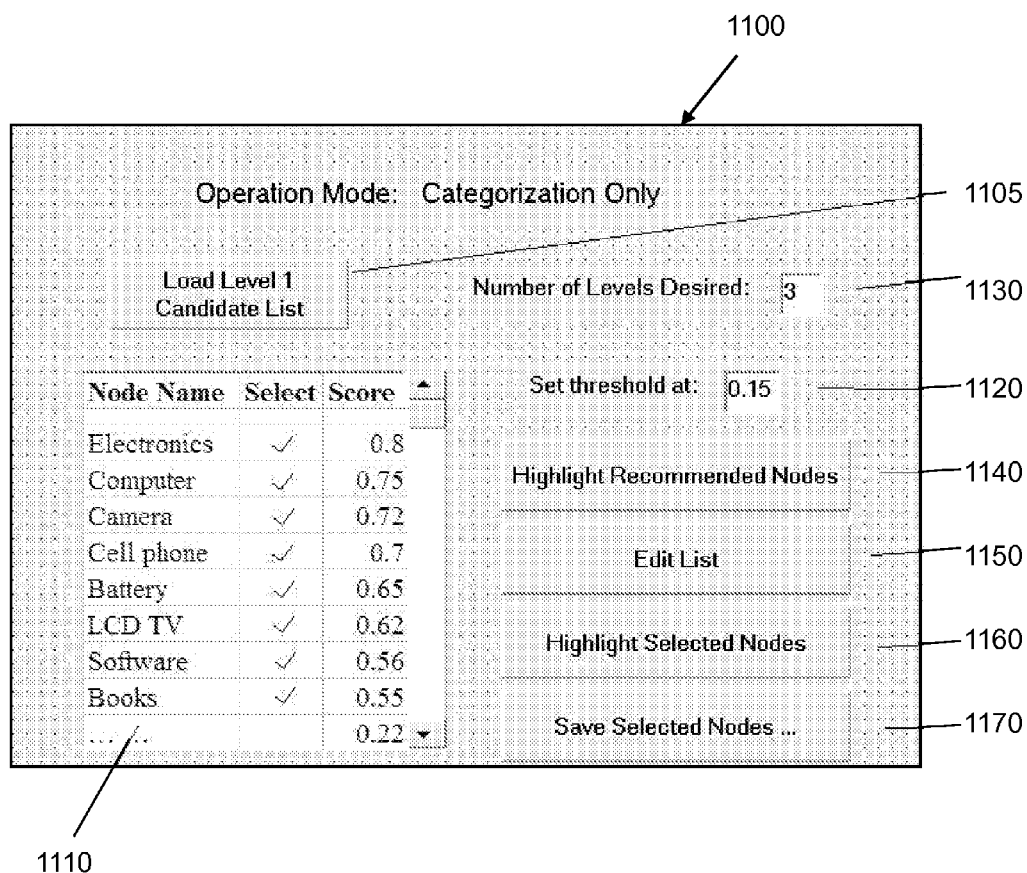
FIG. 11 shows an exemplified user interface for interactively configuring a category structure using a topic list.

Referring to FIG. 11, a user interface 1100 allows a user to interactively configure a category structure using a topic list. The system (e.g. 100, FIG. 1) first applies the above described topic-discovery methods (FIGS. 2, 3, and 4) to produce a topic list ranked by the topic prominence values. In the interactive mode, the user can click a button 1105 to load a candidate list. The system (e.g. 100, FIG. 1) selects a portion of the most prominent topic terms and displays a candidate list 1110 in the user interface 1100 as candidates for top-level category nodes. The user can set a threshold value in 1120 (e.g. 0.15). The system (e.g. 100, FIG. 1) selects a subset of the topic terms above the threshold as candidates for the top-level category nodes. The user can highlight the candidate nodes recommended by the system by clicking the button 1140. The user can change the threshold value to adjust the number of candidate nodes displayed. The user can specify the number of levels in 1130 desired to be in the category tree for the entire document collection from the user interface 1100.

Using the user interface 1100, the user can inspect the said initial category list 1110, and manually refine, or edit the list as appropriate by clicking on the button 1150. Once the category nodes are selected from the candidate topic list, the user can highlight the selected nodes by clicking on the button 1160. The user can create upper level nodes and re-arrange the current level nodes into such upper level nodes based on the user's preference and knowledge. Each category node can either be defined using a single topic name, or can be defined with a name that represents a plurality of topics names. For example, if the candidate list 1110 includes such topic names as "electronics", "computer", "camera", "cell phone", "battery", "LCD TV", "software", "books", etc., the user may use the single topic name of "electronics" as a category node/name to represent all other topic names; or the user can add other category nodes/names such as "computer products" to represent other topic names such as "computer", "software"; or the user can add additional category nodes such as "home appliance" to represent additional topics that are not shown in the exemplar user interface, such as "washing machine", "dryer", "heater", etc.

Once the top-level categories are defined, the user has the option to further define lower-level sub-categories, or stop at the current level.

If the user decides to define lower level subcategories, the user may continue to select topic names from the existing candidate list, and put them under one or more of the top-level category nodes as lower-level sub-category nodes. For example, the user may put "HDTV", "digital camera", etc., under the upper-level category node of "electronics" as the subcategory nodes. Or, the user can choose to generate new sub-topic list for each upper-level category node. To do this, the user can use the top-level category names as search queries, and retrieve documents using the search method of the user's choice to form a subset of documents that share the topics defined by the category name. Then the user can apply the topic-discovery methods described in FIGS. 1, 2, 3 and 4 above to generate the sub-topic list from the subset of the documents so retrieved. This process can be repeated until the desired depth of the category tree is reached.

The selected nodes or the structure of the category tree can be saved to a file by clicking on the button 1170.

One advantage of the presently disclosed methods over the conventional methods of constructing a category tree for a specific document collection is that from the topic list the user already know what type of document contents are in the collection; and the user may only need to re-arrange the topic names to form the tree, without reading and analyzing the contents in the entire document collection beforehand, thus saving the human labor cost that could be prohibitively high for many companies and organizations.

In the automatic mode, the category tree can be automatically constructed with the topic list without human intervention. This is particularly effective when resources for human interaction are not available, or when the levels of the category tree do not need to be deep, or when some lower precision in categorizing the documents can be tolerated.

The system first uses the most prominent topic names that are above the set threshold as the top-level category nodes. Then the system uses such topic names as search queries to retrieve subsets of documents that share the common topics, and then applies the topic-discovery methods as described above in the present disclosure to generate the lower-level sub-topic lists for each subset of documents, and selects the most prominent sub-topics as the nodes for sub-categories, respectively. This process can be repeated until the desired depth of category tree is reached, without human intervention.

It should be understood that the above described methods and systems are not limited to the specific examples used. Configurations and processes can vary without deviating from the spirit of the invention. For example, after topics or sub-topics are obtained, the searches of documents using a topic or sub-topic name can be implemented by methods other than the quantitative information assessment methods described above. The searches may be conducted without using property names and their respective association strengths related to a topic or a subtopic. Moreover, the modules in the system can be configured differently from what is shown in the Figures. Different modules can be combined into a single module. Some modules can also be separated into different modules.

What is claimed is:

1. A computer-assisted method for automatically discovering topics in a document collection comprising one or more documents that comprise sentences and terms, comprising:
    automatically dividing each of the sentences into the grammatical components of a subject and a predicate by a computer system, wherein the predicate is defined as the portion of a sentence other than the subject;
    assigning a first weighting coefficient to subjects in the sentences;
    assigning a second weighting coefficient to predicates in the sentences;
    tokenizing the sentences to produce a plurality of tokens, wherein each of the terms is associated with one or more of the plurality of tokens;
    for each one of the terms,
        calculating a first token count in the plurality of tokens in which the one of the terms matches a subject in the sentences;
        multiplying the first weighting coefficient with the first token count to produce a first weighted token count;
        calculating a second token count in the plurality of tokens in which the one of the terms matches a predicate in the sentences;
        multiplying the second weighting coefficient with the second token count to produce a second weighted token count;
        producing a first score value for the one of the terms based on the first weighted token count and the second weighted token count, wherein the first score can be referred to as an internal term prominence (ITP) value in comparison to a second value, wherein the second value can be referred to as an external term prominence (ETP) value, wherein the ETP value represents the prominence of the term outside the document collection;
    selecting one or more terms from the terms at least in part based on the first score values of the terms; and
    outputting the one or more terms representing one or more topics associated with the document collection.

2. The computer-assisted method of claim 1, wherein the document collection can be divided into a plurality of text units, wherein each text unit can be a sentence, a paragraph, a document, or a group of documents, wherein the first score can further be divided by the total number of the text units.

3. The computer-assisted method of claim 1, further comprising:
    obtaining a data set comprising a plurality of ETP values each associated with one of the terms, and
    producing a third score value for each of the terms using its associated ITP and ETP value, wherein the third score value can be referred to as the collection-specific term prominence (CSTP) value, wherein the one or more terms are selected from the terms using the CSTP values of the respective terms as representing one or more topics associated with the document collection.

4. The computer-assisted method of claim 3, wherein the one or more terms selected from the plurality of tokens have their respective CSTP values above a predetermined threshold.

5. The computer-assisted method of claim 3, wherein the CSTP value is equal to the ITP value subtracted by the ETP value.

6. The computer-assisted method of claim 3, wherein the CSTP value is the square of ITP value divided by a sum of the ITP value and the ETP value.

7. The computer-assisted method of claim 1, wherein some of the subjects in the sentences comprise multi-word phrases, the computer-assisted method further comprising:
    dividing each of the multi-word phrases in the subjects in the sentences into the grammatical components of a head and a modifier;
    assigning a third weighting coefficient to heads in the multi-word phrases in the subjects in the sentences;
    assigning a fourth weighting coefficient to modifiers in the multi-word phrases in the subjects in the sentences;
    for each one of the terms,
        calculating a third token count in the plurality of tokens in which the one of the terms matches a head in a subject in the sentences;
        multiplying the third weighting coefficient with the third token count to produce a third weighted token count;
        calculating a fourth token count in the plurality of tokens in which the one of the terms matches a modifier in a subject in the sentences;
        multiplying the fourth weighting coefficient with the fourth token count to produce a fourth weighted token count; and
        producing the first score based on the first weighted token count, the second weighted token count, the third weighted token count, and the fourth weighted token count.

8. The computer-assisted method of claim 1, wherein some of the predicates in the sentences comprise multi-word phrases, the computer-assisted method further comprising:
    dividing each of the multi-word phrases in the predicates in the sentences into the grammatical components of a head and a modifier;
    assigning a fifth weighting coefficient to heads in the multi-word phrases in the predicates in the sentences;

assigning a sixth weighting coefficient to modifiers in the multi-word phrases in the predicates in the sentences;

for each one of the terms, calculating a fifth token count in the plurality of tokens in which the one of the terms matches a head in a predicate in the sentences;

multiplying the fifth weighting coefficient with the fifth token count to produce a fifth weighted token count;

calculating a sixth token count in the plurality of tokens in which the one of the terms matches a modifier in a predicate in the sentences;

multiplying the sixth weighting coefficient with the sixth token count to produce a sixth weighted token count; and producing the first score based on the first weighted token count, the second weighted token count, the fifth weighted token count, and the sixth weighted token count.

9. The computer-assisted method of claim 1, wherein at least some of the sentences are obtained from one or more files in a file folder in a computer file system, or one or more emails in an email folder or an email mailbox, or a collection of other types of text contents including web contents.

10. The computer-assisted method of claim 1, further comprising:

displaying, at a user interface, the one or more selected terms, or at least a portion of the one or more documents in the document collection in connection with the display of the one or more selected terms.

11. The computer-assisted method of claim 1, further comprising:

grouping documents in the document collection into one or more categories or groups based on the one or more selected terms contained in the respective documents, wherein the selected terms can each represent a document category or group; and displaying, at a user interface, at least a portion of the documents associated with each category or each group in connection with the display of the one or more selected terms.

12. A system for automatically discovering topics in a document collection comprising one or more documents that comprise sentences and terms, comprising:

a computer processor configured to automatically divide each of the sentences into the grammatical components of a subject and a predicate by a computer system, wherein the predicate is defined as the portion of a sentence other than the subject;

assign a first weighting coefficient to subjects in the sentences;

assign a second weighting coefficient to predicates in the sentences;

tokenize the sentences to produce a plurality of tokens, wherein each of the terms is associated with one or more of the plurality of tokens;

for each one of the terms, calculate a first token count in the plurality of tokens in which the one of the terms matches a subject in the sentences;

multiply the first weighting coefficient with the first token count to produce a first weighted token count;

calculate a second token count in the plurality of tokens in which the one of the terms matches a predicate in the sentences;

multiply the second weighting coefficient with the second token count to produce a second weighted token count;

produce a first value for the one of the terms based on the first weighted token count and the second weighted token count, wherein the first value can be referred to as an internal term prominence (ITP) value in comparison to a second value, wherein the second value can be referred to as an external term prominence (ETP) value, wherein the ETP value represents the prominence of the term outside the document collection;

select one or more terms from the terms at least in part based on the score values of the terms; and output the one or more terms to represent the topics associated with the document collection.

13. A computer-assisted method for determining a term score and displaying terms extracted from a document collection, comprising:

obtaining, by a computer system, a document collection comprising one or more documents each comprising sentences and terms, wherein each term comprises a word or a multi-word phrase; wherein a multi-word phrase comprises two or more sub-phrases, wherein each sub-phrase comprises a word or another multi-word phrase;

assigning a sub-phrase weighting co-efficient to the sub-phrase of a multi-word phrase;

tokenizing the sentences to produce a plurality of words or multi-word phrases as tokens, wherein a term matches with one or more of the plurality of tokens;

for one or more terms in the document collection, calculating a sub-phrase token count of the term for each token of the term that is a sub-phrase of a multi-word phrase;

multiplying the sub-phrase weighting co-efficient with the sub-phrase token count to produce a weighted sub-phrase token count for the term;

calculating a non-sub-phrase token count of the term for each token of the term that is not a sub-phrase of a multi-word phrase;

producing a score value for the term based on the weighted sub-phrase token count and the non-sub-phrase token count, wherein the score value can be referred to as an internal term prominence value in comparison to a second value, wherein the second value can be referred to as an external term prominence value, wherein the second value represents the prominence of the term outside the document collection;

selecting one or more terms at least in part based on the score values of the terms; and outputting, for storage or display, the selected terms.

14. The computer-assisted method of claim 13, wherein the sub-phrases in a multi-word phrase are further identified as a first sub-phrase and a second sub-phrase, the method further comprising:

assigning a first weighting co-efficient to the first sub-phrase;

assigning a second weighting co-efficient to the second sub-phrase;

calculating a first token count of the term for each token of the term that is a first sub-phrase of a multi-word phrase;

multiplying the first weighting co-efficient with the first token count to produce a first weighted token count for the term;

calculating a second token count of the term for each token of the term that is a second sub-phrase of a multi-word phrase;

multiplying the second weighting co-efficient with the second token count to produce a second weighted token count of the term; and producing a score value for the term based on the first weighted token count or the second weighted token count.

15. The computer-assisted method of claim 14, wherein the first sub-phrase can be associated with the grammatical role of a modifier in the multi-word phrase, and the second sub-phrase can be associated with the grammatical role of a head in the multi-word phrase.

16. The computer-assisted method of claim 13, wherein the document collection can be divided into a plurality of text units, wherein each text unit can be a sentence, a paragraph, a document, or a group of documents, wherein the score value can further be divided by the total number of the text units.

17. The computer-assisted method of claim 13, wherein the documents in the document collection are one or more files in a file folder in a computer file system, or one or more emails in an email folder or an email mailbox, or obtained from a collection of other types of text contents including web contents.

18. The computer-assisted method of claim 13, further comprising:

displaying, at a user interface, the selected terms, or at least a portion of the one or more documents associated with the selected terms in connection with the display of the selected terms.

19. The computer-assisted method of claim 13, further comprising:

grouping documents in the document collection into one or more categories or groups based on the selected terms contained in the respective documents, wherein the selected terms can each represent a document category or group.

20. The computer-assisted method of claim 19, further comprising:

displaying, at a user interface, at least a portion of the documents associated with each category or each group in connection with the display of the selected terms.

\* \* \* \* \*